(12) United States Patent
Fawcett

(10) Patent No.: US 9,900,374 B2
(45) Date of Patent: *Feb. 20, 2018

(54) APPLICATION BUNDLE MANAGEMENT ACROSS MIXED FILE SYSTEM TYPES

(71) Applicant: International Business Machines Corporation, Armonk, NY (US)

(72) Inventor: Bradley W. Fawcett, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 144 days.

This patent is subject to a terminal disclaimer.

(21) Appl. No.: 14/752,849

(22) Filed: Jun. 27, 2015

(65) Prior Publication Data

US 2016/0342607 A1 Nov. 24, 2016

Related U.S. Application Data

(63) Continuation of application No. 14/718,226, filed on May 21, 2015.

(51) Int. Cl.
*G06F 15/173* (2006.01)
*H04L 29/08* (2006.01)
*G06F 17/30* (2006.01)

(52) U.S. Cl.
CPC ........ *H04L 67/06* (2013.01); *G06F 17/30082* (2013.01); *G06F 17/30115* (2013.01); *H04L 67/1097* (2013.01)

(58) Field of Classification Search
None
See application file for complete search history.

(56) References Cited

U.S. PATENT DOCUMENTS

| 5,008,814 A | 4/1991 | Mathur |
| 5,687,369 A | 11/1997 | Li |
| 5,892,935 A | 4/1999 | Adams |

(Continued)

FOREIGN PATENT DOCUMENTS

DE 102016208672 A1 11/2016

OTHER PUBLICATIONS

An open invitation to beta-test IBM InfoSphere Streams; Oct. 20, 2014.

(Continued)

*Primary Examiner* — Umar Cheema
*Assistant Examiner* — Tony Williams
(74) *Attorney, Agent, or Firm* — Robert C. Bunker

(57) ABSTRACT

Disclosed aspects include managing a file system having a cluster of compute nodes to process a stream of tuples using an application bundle. A cluster bundle directory is established on the cluster of compute nodes. A host bundle library is established on a first compute node of the cluster of compute nodes. The stream of tuples to be processed by a plurality of processing elements operating on the cluster of compute nodes including the first compute node is received. Using the cluster bundle directory, it is detected that the application bundle is not installed on the first compute node. Using both the cluster bundle directory and the host bundle library, a determination is made to initiate a sourcing operation with respect to the application bundle. In response to initiating the sourcing operation, the stream of tuples is processed using the application bundle.

12 Claims, 7 Drawing Sheets

(56) References Cited

U.S. PATENT DOCUMENTS

| | | |
|---|---|---|
| 5,909,581 A | 6/1999 | Park |
| 6,035,423 A | 3/2000 | Hodges et al. |
| 6,047,128 A | 4/2000 | Zander |
| 6,347,396 B1 | 2/2002 | Gard et al. |
| 6,493,871 B1 | 12/2002 | McGuire et al. |
| 6,651,249 B2 | 11/2003 | Waldin et al. |
| 6,938,075 B1 | 8/2005 | Abbott et al. |
| 7,386,845 B1 | 6/2008 | Fox et al. |
| 7,401,133 B2 | 7/2008 | Huang et al. |
| 7,478,382 B2 | 1/2009 | Menahemi et al. |
| 7,734,717 B2 | 6/2010 | Saarimäki et al. |
| 7,770,168 B1 | 8/2010 | Howarth et al. |
| 8,429,642 B1 | 4/2013 | Cheng et al. |
| 8,533,702 B2 | 9/2013 | Ballard et al. |
| 8,589,911 B1 | 11/2013 | Sharkey et al. |
| 8,627,311 B2 | 1/2014 | Auer |
| 8,667,479 B2 | 3/2014 | Johnsson et al. |
| 8,799,886 B1 | 8/2014 | Giannini et al. |
| 8,799,889 B2 | 8/2014 | Jones et al. |
| 8,910,140 B1 | 12/2014 | Giannini et al. |
| 9,112,813 B2 | 8/2015 | Jackson |
| 9,635,129 B2 | 4/2017 | Baldwin |
| 2002/0133491 A1 | 9/2002 | Sim et al. |
| 2003/0079154 A1 | 4/2003 | Park et al. |
| 2003/0233483 A1 | 12/2003 | Melchione et al. |
| 2004/0003387 A1 | 1/2004 | Ballard et al. |
| 2004/0019889 A1 | 1/2004 | Melchione et al. |
| 2005/0216559 A1 | 9/2005 | Manion et al. |
| 2005/0289538 A1* | 12/2005 | Black-Ziegelbein ..... G06F 8/61 717/177 |
| 2006/0070058 A1 | 3/2006 | Menahemi et al. |
| 2006/0143350 A1 | 6/2006 | Miloushev et al. |
| 2006/0195840 A1 | 8/2006 | Sundarrajan et al. |
| 2007/0239859 A1 | 10/2007 | Wilkinson et al. |
| 2008/0028401 A1 | 1/2008 | Geisinger |
| 2008/0034071 A1 | 2/2008 | Wilkinson et al. |
| 2008/0133650 A1 | 6/2008 | Saarimaki et al. |
| 2009/0222505 A1 | 9/2009 | Pavan et al. |
| 2010/0162233 A1 | 6/2010 | Ku et al. |
| 2011/0010461 A1 | 1/2011 | Lassila et al. |
| 2011/0276957 A1 | 11/2011 | Johnsson et al. |
| 2012/0036220 A1* | 2/2012 | Dare .......................... G06F 8/61 709/217 |
| 2012/0042309 A1 | 2/2012 | Risan |
| 2012/0054345 A1 | 3/2012 | Sahu et al. |
| 2012/0102369 A1* | 4/2012 | Hiltunen ............... G06F 11/008 714/48 |
| 2012/0124187 A1 | 5/2012 | Cada et al. |
| 2012/0151190 A1 | 6/2012 | Usuba |
| 2012/0198438 A1 | 8/2012 | Auer |
| 2013/0080600 A1 | 3/2013 | Santosuosso et al. |
| 2013/0103787 A1* | 4/2013 | Glover ................ H04L 67/1002 709/217 |
| 2013/0139142 A1 | 5/2013 | Ikawa et al. |
| 2013/0151711 A1 | 6/2013 | Jackson |
| 2013/0198318 A1 | 8/2013 | Branson et al. |
| 2013/0219211 A1 | 8/2013 | Gopinath et al. |
| 2013/0283259 A1 | 10/2013 | Ellis et al. |
| 2014/0019957 A1 | 1/2014 | Wang et al. |
| 2014/0023037 A1 | 1/2014 | Kalmbach et al. |
| 2014/0025986 A1 | 1/2014 | Kalyanaraman et al. |
| 2014/0095591 A1 | 4/2014 | Chan et al. |
| 2014/0136794 A1 | 5/2014 | Raman |
| 2015/0127774 A1 | 5/2015 | Hitomi et al. |
| 2016/0156715 A1 | 6/2016 | Larouche et al. |
| 2016/0162283 A1 | 6/2016 | Lightner et al. |
| 2016/0342402 A1 | 11/2016 | Fawcett |
| 2016/0342404 A1 | 11/2016 | Fawcett |
| 2016/0342405 A1 | 11/2016 | Fawcett |
| 2016/0342659 A1 | 11/2016 | Fawcett |
| 2016/0344786 A1 | 11/2016 | Fawcett |
| 2016/0344793 A1 | 11/2016 | Fawcett |
| 2016/0344799 A1 | 11/2016 | Fawcett |
| 2016/0344811 A1 | 11/2016 | Fawcett |
| 2016/0344843 A1 | 11/2016 | Fawcett |

OTHER PUBLICATIONS

List of IBM Patents or Patent Applications Treated as Related.

Fawcett, Bradley W., "Application Bundle Management Across Mixed File System Types", U.S. Appl. No. 14/718,226, filed May 21, 2015.

Google, "node software license management by node H04167/10," Google Search, p. 1-2, https://www.google.com/search?site=&tbm=pts&source=hp&q=node+software+license+management+by+node+H04I67%2F10&oq=node+software+license+, Accessed on Mar. 30, 2017.

Google, "node software license threshold management by node H04167/10," Google Search, p. 1-2, https://www.google.com/search?tbm=pts&hl=en&q=node+software+license+threshold+management+by+node+H04I67%2F10, Accessed on Mar. 30, 2017.

* cited by examiner

APPLICATION BUNDLE MANAGEMENT ACROSS MIXED FILE SYSTEM TYPES

The following disclosure(s) are submitted under 35 U.S.C. 102(b)(1)(A): An open invitation to beta-test IBM InfoSphere Streams, Oct. 20, 2014.

BACKGROUND

This disclosure relates generally to computer systems and, more particularly, relates to stream computing. Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Aspects of the disclosure include managing a file system having a cluster of compute nodes to process a stream of tuples using an application bundle. A cluster bundle directory is established on the cluster of compute nodes. A host bundle library is established on a first compute node of the cluster of compute nodes. The stream of tuples to be processed by a plurality of processing elements operating on the cluster of compute nodes including the first compute node is received. Using the cluster bundle directory, it is detected that the application bundle is not installed on the first compute node. Using both the cluster bundle directory and the host bundle library, a determination is made to initiate a sourcing operation with respect to the application bundle. In response to initiating the sourcing operation, the stream of tuples is processed using the application bundle.

Aspects of the disclosure include a multilevel directory/library structure having a global directory for a cluster of compute nodes and a local library on hosts (e.g., one or more hosts). The global directory has information with respect to which hosts have an application bundle installed in them and the local library has information with respect to which hosts share application bundle(s). Hosts have access to a local library (e.g., host bundle library) somewhere in the cluster, but it may not be unique to that local host, as one or more hosts may share the local library. Hosts can determine which other hosts are sharing by examining the host catalog section. Hosts can register its intended use of the local library at start-up (e.g., by signing its host identifier into the host catalog section). If the application bundle is shared by other hosts, it can be identified via the registration entries. A bundle controller can use the information to determine sourcing operations with respect to sharing or installation (e.g., sharing a particular application bundle in response to the particular application bundle being installed). Aspects of the disclosure may provide performance or efficiency benefits when managing one or more application bundles (e.g., speed, flexibility, responsiveness, resource usage).

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
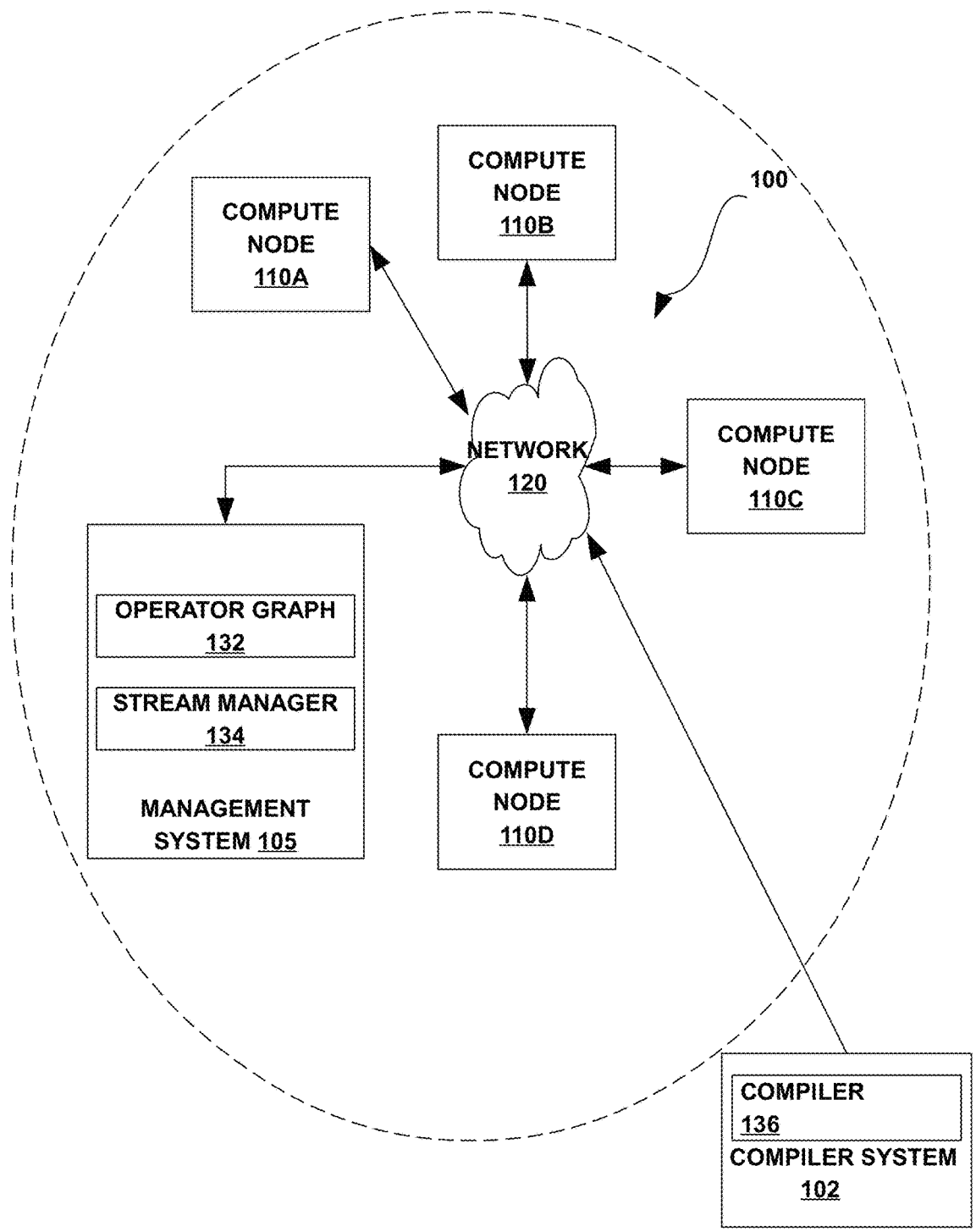
FIG. 1 illustrates a computing infrastructure configured to execute a stream computing application according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include a multilevel directory/library structure having a global directory for a cluster of compute nodes and a local library on hosts (e.g., one or more hosts). The global directory has information with respect to which hosts have an application bundle installed in them and the local library has information with respect to which hosts share application bundle(s). Hosts have access to a local library (e.g., host bundle library) somewhere in the cluster, but it may not be unique to that local host, as one or more hosts may share the local library. Hosts can determine which other hosts are sharing by examining the host catalog section. Hosts can register its intended use of the local library at start-up (e.g., by signing its host identifier into the host catalog section). If the application bundle is shared by other hosts, it can be identified via the registration entries. A bundle controller can use the information to determine sourcing operations with respect to sharing or installation (e.g., sharing a particular application bundle in response to the particular application bundle being installed). Aspects of the disclosure may provide performance or efficiency benefits when managing one or more application bundles (e.g., speed, flexibility, responsiveness, resource usage).

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform determines the desired placement of the processing elements in the job and schedules the processing elements for execution on the decided host. Each host in the cluster may have zero or more processing elements placed for execution.

In order for the processing element to be run on a host, access is had to its associated application binaries (application bundles). A streams processing application may be executed on a potentially large set of hosts. When a new job is submitted into the system, the associated application bundle is to be made available to all hosts that will run this aspect. Availability can be performed by provisioning (e.g., file transfer) of the application bundle to the desired hosts, or by placing the application bundle in a shared file system location that is accessible to the target hosts. Application bundles can be relatively large, so there is a measurable cost of moving application bundles between hosts and for storing them on a host.

Provisioned application bundles and shared file application bundles both have performance or efficiency impacts based on particular configurations. Provisioned application bundles can include efficient storage access speed and local control while consuming resources when provisioning and in storage redundancies. Shared application bundles can efficiently use storage and efficiently start-up while management, maintenance, and file access speeds may present challenges. Whether or not to use a shared or non-shared file system may have performance or efficiency benefits if it is a host independent choice.

For example, while the cluster administrator may select to use shared file system wherever possible, some hosts may have limited capability for using the shared file system. Some hosts may have limited storage, so those hosts may desire to use a shared file system location. Also, individual hosts may not want to make a host-wide decision of which file system type to use. Individualized choices for each of the file system segments that it has can be utilized (e.g., some shared, some not shared). Regardless that the choice is made independently by each host, the knowledge of which choice was made can be communicated throughout the cluster. As such, the application bundles may be managed differently if they are shared or not shared.

Application bundles may be handled by a group of operations. When a processing element is started, a bundle controller can determine if the related application bundle already exists on this host. If the bundle controller determines it is not on this host, it can determine if it already exists in shared storage and therefore does not need to be installed into the storage. Also, the bundle controller can determine if it is a new request to this host and the application bundle is to be downloaded into its storage. In embodiments where the application bundle is installed within a shared file system, possible file latency may be desired to be accounted for. When a processing element is terminated, the bundle controller may determine if the application bundle can be uninstalled (or not uninstalled if there a sharing host that still needs it).

A cluster-wide, master application bundle directory can be maintained having a directory of install hosts for every application bundle, a set of hosts that share the application bundle storage, and a methodology for describing the application bundle storage. For instance, there may be multiple application bundle storage units per host, with different sharing partners. For example, the application bundle storage may include a computer network address for the shared file system server along with a relative file system path (the absolute file system path may be different on each host, but still sharing via relative paths, whose root location can be host dependent).

A determination can be made as to whether file latency has been accounted for on shared application bundle storage locations. File data latency can occur on shared file systems, where the data is present in one view of the file system data on one system, but it may not be fully available yet on a different host that is sharing this file system. To implement and maintain a master application bundle directory can have challenges. Each host administrator may be required to communicate with other host administrators to determine the shared file system configuration and gain assent on an application bundle storage format and contents to use to describe it. If a particular host administrator decides to change its configuration, communicate of these changes would then occur. As such, challenges are presented such as a burdensome master cluster directory implementation, close communication between cluster host administrators, burdensome maintenance operations to master cluster directory such as adding a new file system segment to a subset of hosts that will be shared, or manual maintenance of configuration having a risk of error.

Aspects of the multilevel directory/library structure disclosed herein can address the challenges of the cluster-wide, master application bundle directory. Aspects of the disclosure may provide performance or efficiency benefits when managing one or more application bundles using a multilevel directory/library structure having a global directory for a cluster of compute nodes and a local library on hosts. Such performance or efficiency benefits can be related to speed, flexibility, responsiveness, or resource usage.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
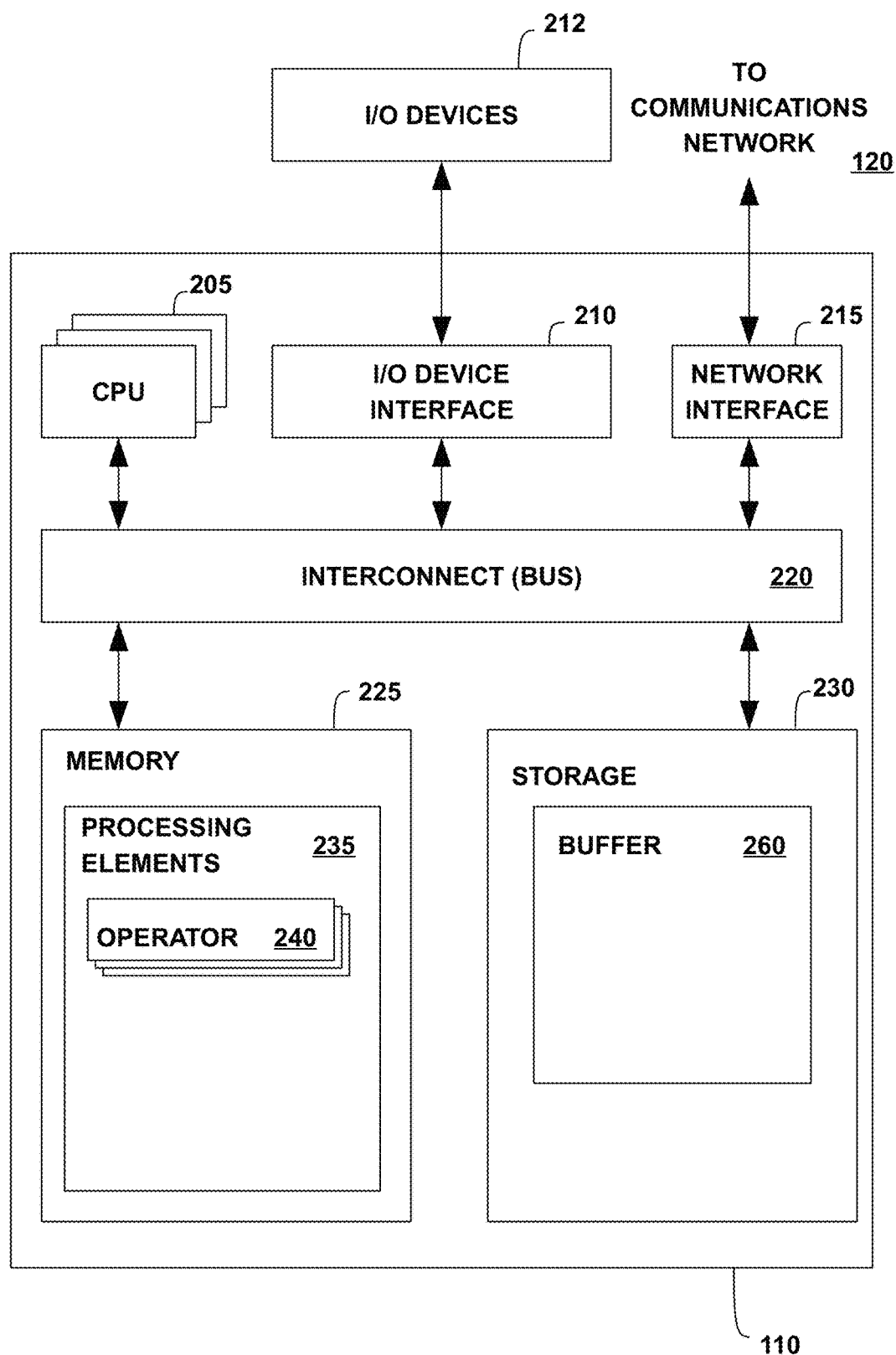
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
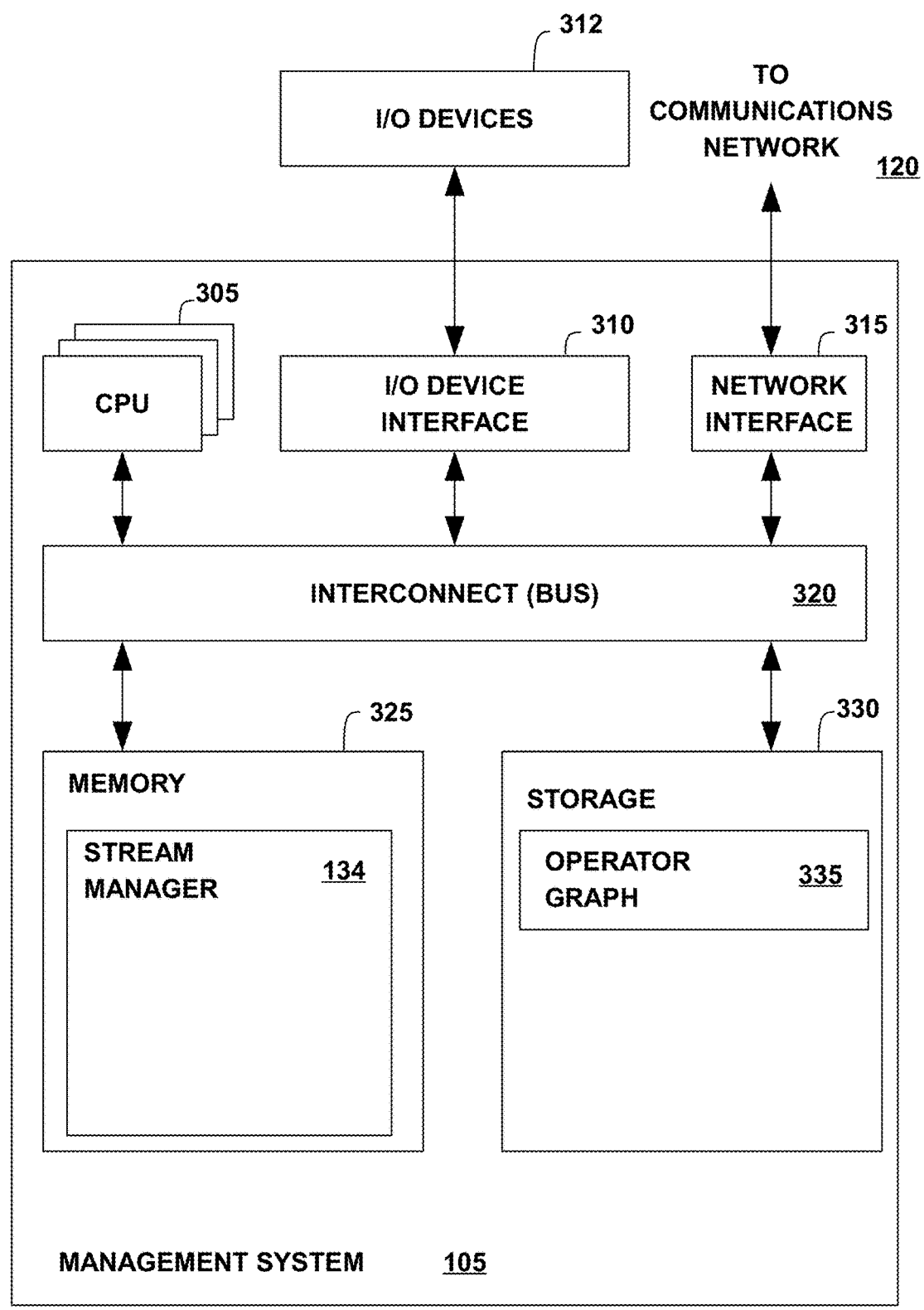
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
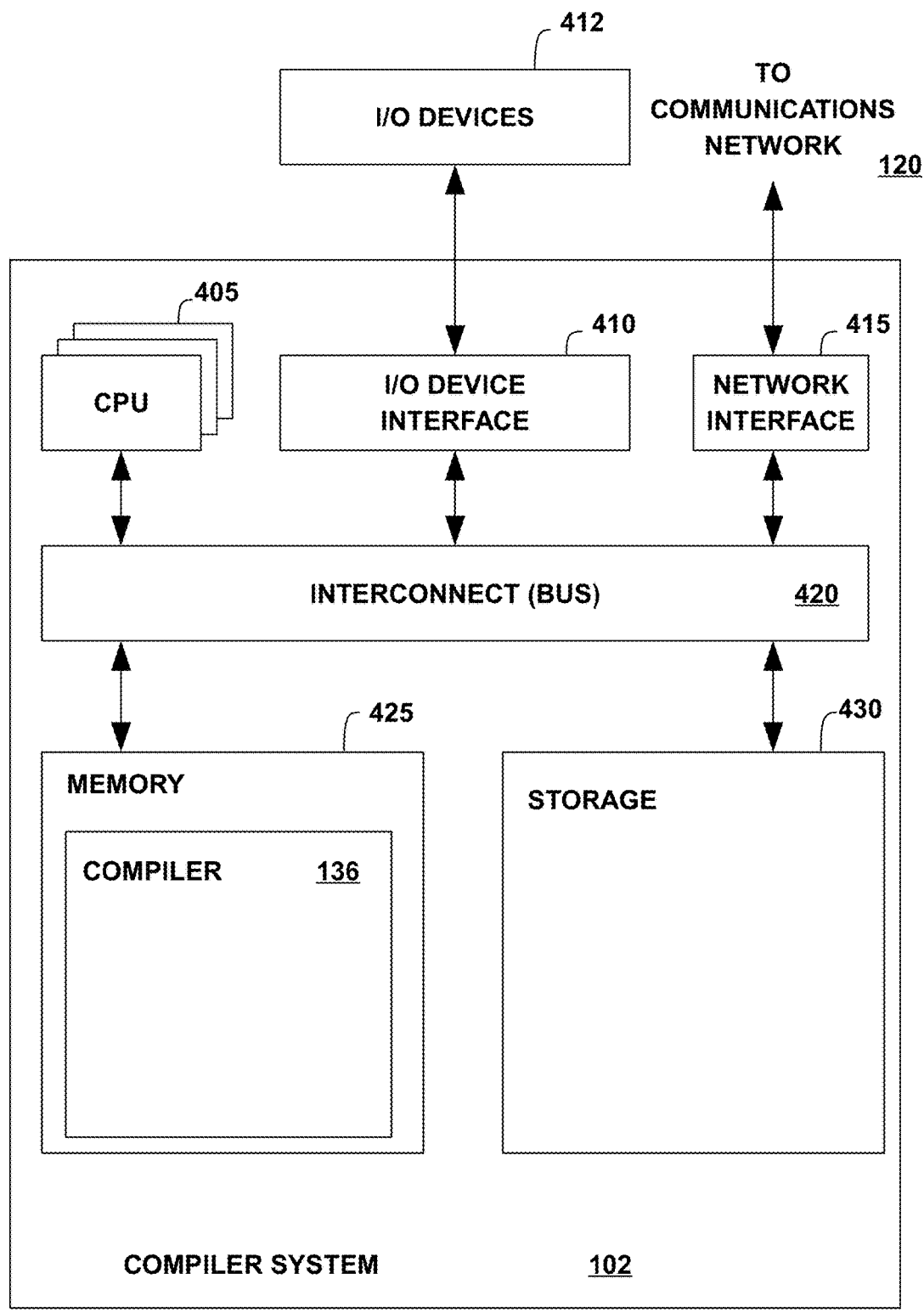
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
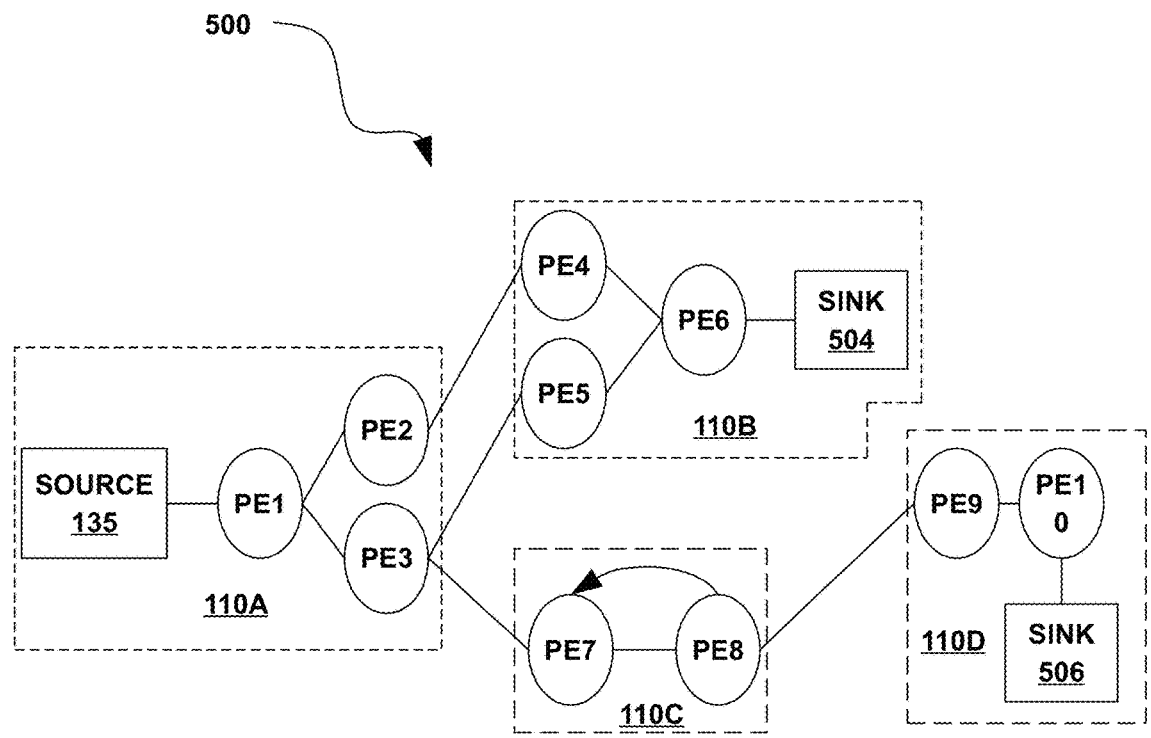
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
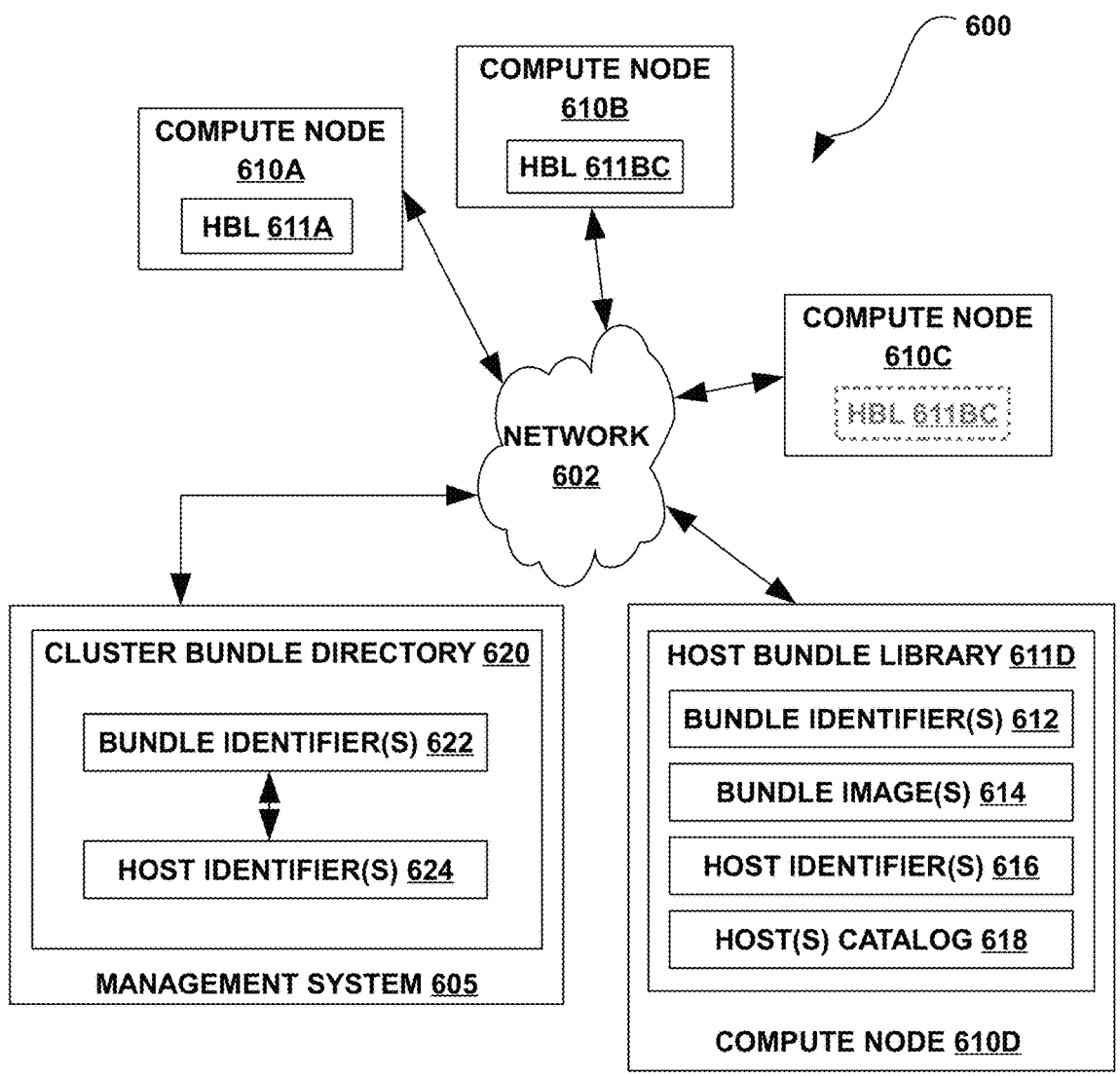
FIG. 6 shows an example system for using application bundle management with respect to executing a stream computing application according to embodiments.

FIG. 6 shows an example system 600 for using application bundle management with respect to executing a stream computing application according to embodiments. The example system 600 can include a mixed file system type (e.g., shared/non-shared). Aspects of the example system 600 may implement a multi-level directory structure. The multi-level directory structure can include a global directory/library/catalog for cluster and local directory/library/catalog on each host. The multi-level directory structure may be constructed as part of a management system 605, compute nodes 610A/610B/610C/610D, and with respect to network 602.

A local directory (e.g., host bundle library 611D, 611A) has information with respect to which hosts share application bundle(s) and can include self-registration section for sharing hosts (e.g., host identifiers 616/hosts catalog 618). In embodiments, the local directory may be shared by a plurality of hosts (e.g., host bundle library 611BC which can be shared by compute nodes 610B, 610C and may illustratively have library data storage on compute node 610B accessible by compute node 610C without library data storage on compute node 610C). Hosts can register its intended use of the local library at start-up (e.g., by signing its host identifier into the host catalog section). If the application bundle is shared by other hosts, it can be detected/identified via the registration entries (e.g., hosts can determine which other hosts are sharing by examining the host catalog section). A bundle controller of the management system 605 can use local directory sharing information (e.g., bundle identifiers 612) to determine sharing sets (which use bundle images 614) or sourcing operations with respect to sharing or installation (e.g., sharing a particular application bundle in response to the particular application bundle being installed). The bundle controller can also use such information in a manner consistent with the global application bundle directory information (e.g., cluster bundle directory 620 having bundle identifiers 622/host identifiers 624).

For instance, the cluster bundle directory 620 may be stored in one location and can include the bundle identifiers 622 (e.g., names for particular application bundles) and host identifiers 624 (e.g., a list of hosts that application bundle has been installed on). To illustrate, a first record may have AB#1 on HostD & HostB; a second record may have AB#2 on HostC & HostD; a third record may have AB#3 on HostD & HostB; and, a fourth record may have AB#4 on HostC. The host bundle library 611D may have the host identifiers 616 which indicate hosts that are using the application bundle library 611D (e.g., sharing hosts for a shared file system), the hosts catalog 618 which can include a file named for the using hosts (e.g., HostD, HostB), the bundle identifiers 612 (e.g., AB#1, AB#2, AB#3), and the bundle images 614 (e.g., Image1, Image2, Image3). As such, HostC may have a separate host bundle library. In embodiments, the first host to be initiated may create the host bundle library (for the shared file system). In certain embodiments, the host identifiers 616 and the hosts catalog 618 may be a single component (e.g., one data object).

Accordingly, aspects of example system 600 may provide performance or efficiency benefits (e.g., speed, flexibility, responsiveness, resource usage) when managing an application bundle. Aspects can be implemented locally in an efficient manner. Global communication between cluster host administrators may be positively impacted. File storage configurations, and communications pertaining to such, may be efficiently performed. Multiple file storage segments per host can be supported for performance or efficiency benefits.

Consider an operative example where both the cluster bundle directory and the host bundle library have been established. Reception of stream of tuples to be processed by a plurality of processing elements operating on the cluster of compute nodes including the first compute node can occur. It can be detected, using the cluster bundle directory, that the application bundle desired for processing the stream of tuples is not installed on the first compute node. If none of the sharing hosts in the host bundle library are listed in the cluster bundle directory as having the application bundle, the application bundle is downloaded to the first compute node from a non-sharing host listed in the cluster bundle directory. If a sharing host in the host bundle library is listed in the cluster bundle directory as having the application bundle, the application bundle may be sourced via sharing.

Figure 7:
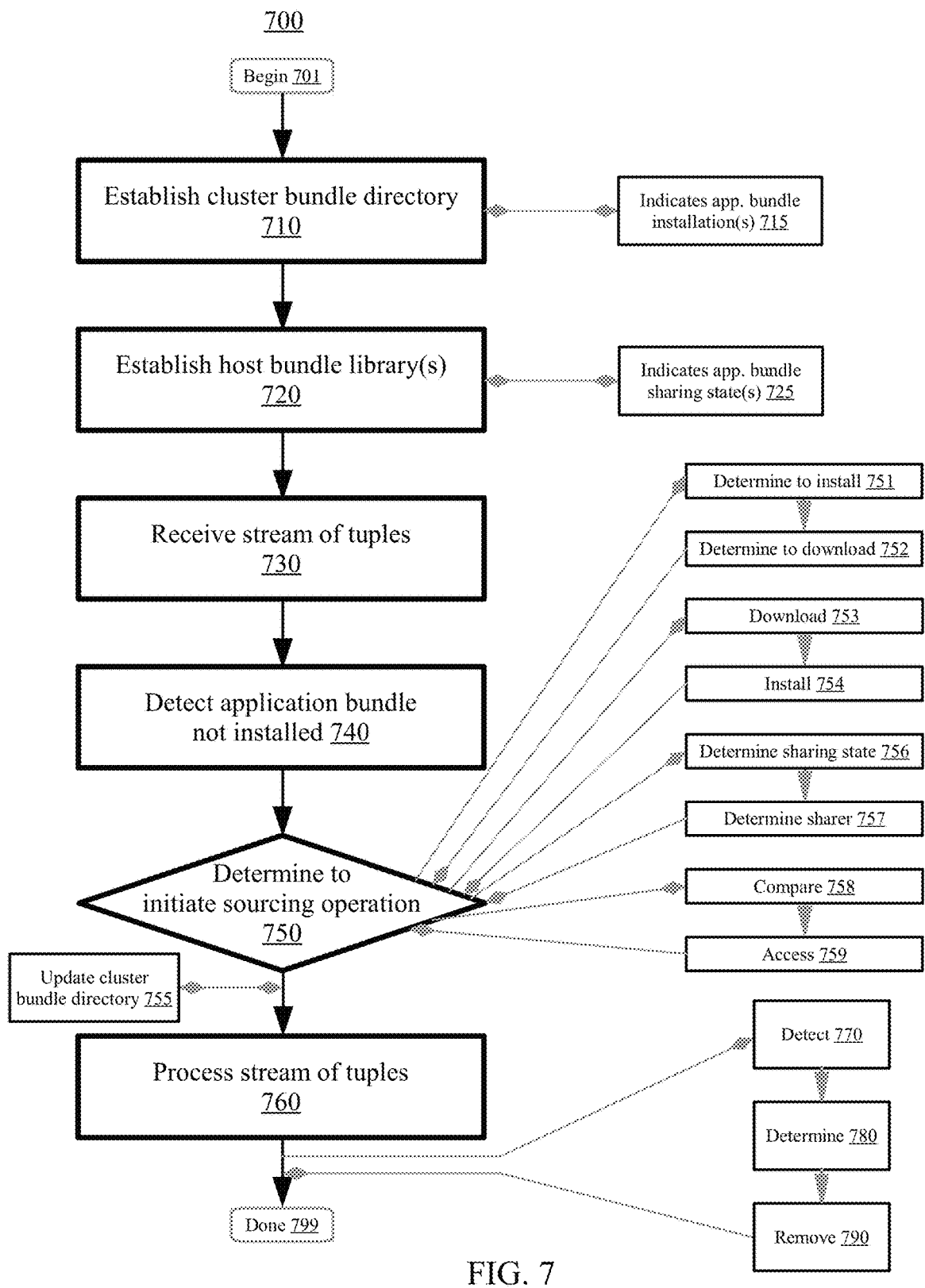
FIG. 7 is a flowchart illustrating a method for processing a stream of tuples using an application bundle according to embodiments.

FIG. 7 is a flowchart illustrating a method 700 for processing a stream of tuples using an application bundle according to embodiments. Aspects of method 700 can manage a file system having a cluster of compute nodes to process a stream of tuples using an application bundle. Aspects can include a directory available across all hosts to indicate which bundles are on which hosts and a library on each host itself to indicate which hosts are being shared. In certain embodiments, user/administrator/host may have a choice for a file system unique to itself or to a shared configuration. Method 700 may begin at block 701.

At block 710, a cluster bundle directory is established. The cluster bundle directory is established on the cluster of compute nodes. For example, in one location separate from a plurality of compute nodes and associated with an application bundle controller (e.g., on the same system as the application bundle controller). In embodiments, the cluster bundle directory indicates installation of at least one application bundle on a subgroup of the cluster of compute nodes at block 715. For instance, if the cluster has 10 nodes, 3 of those nodes may have one or more application bundles installed.

The cluster bundle directory may be maintained at a cluster level. It can be accessible to a plurality of (e.g., all) hosts in the cluster. The cluster bundle directory may identify/detail where (e.g., which compute nodes) one or more application bundles are currently installed at. In certain embodiments, it may keep historical data which can serve as a predictive baseline with respect to particular jobs/tasks. As one or more application bundles are installed/uninstalled in the various compute nodes of the cluster, the cluster bundle directory may be updated (see herein).

At block 720, a host bundle library is established. The host bundle library is established on a first compute node of the cluster of compute nodes. A plurality (e.g., each) of the cluster of compute nodes may have host bundle libraries which are specific to the particular compute node. In embodiments, the host bundle library indicates a set of application bundle sharing states which map to the cluster of compute nodes at block 725. For instance, the host bundle library on the first compute node can indicate/signal/denote/track that a particular compute node of the cluster shares one or more application bundles.

The host bundle library may be maintained at a host level. When a host (e.g., particular compute node) is started-up, it can register/identify its usage of the bundle library by placing/inserting a file/object/identifer with a matching host name/identifier into a sharing hosts section (of the host bundle library). The application bundle itself (e.g., application bundle image) can be placed into a library section. As one or more hosts register their usage (e.g., by writing a file which can be identified/named the same as the host) any/other hosts can see which hosts they are sharing the bundle library with.

At block 730, a stream of tuples is received. The stream of tuples is to be processed by a plurality of processing elements operating on the cluster of compute nodes including the first compute node. The stream of tuples may be received consistent with the description herein including FIGS. 1-6. Current/future processing by the plurality of processing elements may be performed consistent with the description herein including FIGS. 1-6. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

At block 740, the cluster bundle directory is used to detect that the application bundle is not installed on the first compute node. For instance, the cluster bundle directory can be searched for compute nodes having the application bundle. In embodiments, a request may be sent to a bundle controller associated with the cluster bundle directory. If the search fails to return the first compute node as a result, then it may be sensed that the application bundle is not installed on the first compute node. Various methodologies for reading the cluster bundle directory may be used. Also, publish-subscribe or push-pull models are considered with respect to collecting information from the cluster bundle directory. For example, when a processing element is to be started on a specific host, it can detect whether the application bundle is available with respect to the specific host (e.g., check cluster bundle directory to see if the application bundle is installed on the specific host). In such example, if the application bundle is installed it may be used and the methodology may exit; if the application bundle is not installed the methodology may continue.

At block 750, both the cluster bundle directory and the host bundle library are used to determine to initiate a sourcing operation with respect to the application bundle. For instances when the application bundle is not installed on the first compute node, sharing host(s) may be retrieved from the host bundle library (e.g., extracting sharing host data from a repository). Also, the cluster bundle directory may be examined/checked to ascertain if the application bundle is installed on at least one of the sharing hosts (e.g., query a database for the sharing hosts with respect to the application bundle).

If the application bundle is installed on at least one of the sharing hosts, then an installation on the first compute node may be absent from the sourcing operation. The sourcing operation can include accessing/using the application bundle on a particular host which shares the application bundle. Shared storage associated with the particular host/application bundle may be analyzed/checked. The analysis can identify whether any file system latency exists or has been resolved (e.g., by using file system locking mechanisms).

If the application bundle is not installed on any sharing hosts, then the sourcing operation may include the application bundle may be downloaded from one of the locations noted the cluster bundle directory to the appropriate place in the host bundle library. In response to initiating the sourcing operation, the cluster bundle directory may be updated at block 755. Updating can include adding/modifying an entry for the particular host and application bundle with respect to the cluster bundle directory (e.g., regardless of whether the application bundle was installed on at least one of the sharing hosts).

In embodiments, determining, using both the cluster bundle directory and the host bundle library, to initiate the sourcing operation with respect to the application bundle can include a first set of determinations. A first determination of the first set of determinations may be made to install the application bundle on the first compute node at block 751 (e.g., analysis indicates installation of the application bundle outweighs feasibility of using the application bundle from a shared computing environment). A second determination of the first set of determinations may be made to download the application bundle from a second compute node based on the cluster bundle directory at block 752 (e.g., analysis of the cluster bundle directory indicates download from the second compute node is possible and may be efficient with respect to performance relative to other possible download sources).

Accordingly, the sourcing operation can include a first set of components. A first component of the first set of components can include downloading the application bundle from a second compute node at block 753 (e.g., transmitting a request for the application bundle and receiving the application bundle in response to the request). A second component of the first set of components may include installing the application bundle on the first compute node at block 754 (e.g., initiating deployment of the application bundle on the first compute node to be executed when processing the stream of tuples).

In embodiments, determining, using both the cluster bundle directory and the host bundle library, to initiate the sourcing operation with respect to the application bundle can include a second set of determinations. A first determination of the second set of determinations may determine/identify/resolve/ascertain an application bundle sharing state at block 756 (e.g., an indication that at least one application bundle is shared by a specific host by may be indicated by a first value, and an indication that at least one application bundle is not shared may be indicated by a second value which may include a lack of an entry). The first determination of the second set of determinations may be based on the host bundle library (e.g., the host bundle library may be analyzed with respect to the first/second values). The application bundle sharing state can map to the second compute node. A second determination of the second set of determinations may determine that the second compute node shares the application bundle at block 757 (e.g., the second compute node can be shared-from in order to run the application bundle on another compute node such as the first compute node). The second determination of the second set of determinations may be based on the cluster bundle directory (e.g., the cluster bundle directory may indicate the second compute node has the application bundle).

Accordingly, the sourcing operation can include a second set of components. A first component of the second set of components can include analyzing a latency element (e.g., a temporal period related to installation/runtime/removal with respect to data transfer speed/bandwidth/performance/efficiency that may be predicted/current/historical) associated with a second compute node and comparing the latency element with a threshold latency (e.g., a tolerated temporal period for data transfer which may be historically-based or user-defined) at block 758. A second component of the second set of components can include accessing the application bundle on the second compute node at block 759 (e.g., reading shared data, providing inputs and gathering outputs, configuring to process the stream of tuples using the application bundle on the second compute node). The second component of the second set of components may be performed in response to the threshold latency exceeding the latency element (e.g., bandwidth is acceptable for using sharing via the application bundle on the second compute node). The application bundle may be accessed without downloading the application bundle from the second compute node and without installing the application bundle on the first compute node (e.g., the application bundle is physically absent from the first compute node). In certain embodiments, sharing may initially be indicated but the latency element may have such a predicted impact on performance/efficiency such that downloading the application bundle is determined to be appropriate.

At block 760, in response to initiating the sourcing operation, the stream of tuples is processed using the application bundle. The stream of tuples may be processed consistent with the description herein including FIGS. 1-6. In various embodiments, a set of operations may occur in response to processing the stream of tuples using the application bundle. In embodiments, based on both the cluster bundle directory and the host bundle library, a triggering event may be detected at block 770. The triggering event can occur when a last/final processing element of a last/final job that uses a particular application bundle on a particular host gets canceled or is no longer utilized/needed. In response to detecting the triggering event, it may be determined to remove the application bundle at block 780.

The detection/determination can include checking to resolve whether the application bundle may be uninstalled from the host bundle library (e.g., get sharing hosts from host bundle library). The detection/determination may include checking the cluster bundle directory to identify entries that exist for any/other of the sharing hosts (e.g., ascertain if the only host entry is for itself). For instance, if a particular compute node ascertains that the only host entry is for itself, then it may be resolved that the application bundle (e.g., and associated data) may be uninstalled/removed/deleted from the host bundle library. In response to determining to remove the application bundle, the application bundle can be removed at block 790. Removing the application bundle can include editing the cluster bundle directory to remove/delete the particular host-bundle entry.

Method 700 concludes at block 799. Aspects of method 700 may provide performance or efficiency benefits for processing a stream of tuples using an application bundle. For example, aspects of method 700 may include positive impacts on resource usage with respect to maintenance operations or responsiveness with respect to various communications. Altogether, performance or efficiency benefits when managing application bundle(s) may occur (e.g., speed, flexibility, responsiveness, resource usage).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a file system having a cluster of compute nodes to process a stream of tuples using an application bundle, the system comprising:

a memory having a set of computer readable computer instructions, and a processor for executing the set of computer readable instructions, the set of computer readable instructions including:

establishing, on the cluster of compute nodes, a cluster bundle directory, wherein the cluster bundle directory is a first level of a multilevel directory structure, and wherein the cluster bundle directory is a global directory that tracks which host has the application bundle installed;

establishing, on a first compute node of the cluster of compute nodes, a host bundle library, wherein the host bundle library is a second level of the multilevel directory structure, and wherein the host bundle library is a local library that tracks which host shares the application bundle;

receiving the stream of tuples to be processed by a plurality of processing elements operating on the cluster of compute nodes including the first compute node;

detecting, using the cluster bundle directory, that the application bundle is not installed on the first compute node;

determining, using both the cluster bundle directory and the host bundle library, to initiate a sourcing operation with respect to the application bundle; and processing, in response to initiating the sourcing operation, the stream of tuples using the application bundle.

2. The system of claim 1, wherein the cluster bundle directory indicates installation of at least one application bundle on a group of the cluster of compute nodes.

3. The system of claim 1, wherein the host bundle library indicates a set of application bundle sharing states which map to the cluster of compute nodes.

4. The system of claim 1, wherein determining, using both the cluster bundle directory and the host bundle library, to initiate the sourcing operation with respect to the application bundle includes:
determining to install the application bundle on the first compute node; and
determining, based on the cluster bundle directory, to download the application bundle from a second compute node.

5. The system of claim 1, wherein the sourcing operation includes:
downloading the application bundle from a second compute node; and
installing the application bundle on the first compute node.

6. The system of claim 1, wherein determining, using both the cluster bundle directory and the host bundle library, to initiate the sourcing operation with respect to the application bundle includes:
determining, based on the host bundle library, an application bundle sharing state which maps to a second compute node; and
determining, based on the cluster bundle directory, the second compute node shares the application bundle.

7. The system of claim 1, wherein the sourcing operation includes:
comparing, by analyzing a latency element associated with a second compute node, the latency element with a threshold latency; and
accessing, without downloading the application bundle from the second compute node and without installing the application bundle on the first compute node, the application bundle on the second compute node in response to the threshold latency exceeding the latency element.

8. The system of claim 1, further comprising:
updating, in response to initiating the sourcing operation, the cluster bundle directory.

9. The system of claim 1, further comprising, in response to processing the stream of tuples using the application bundle:
detecting, based on both the cluster bundle directory and the host bundle library, a triggering event;
determining to remove the application bundle in response to detecting the triggering event; and
removing the application bundle in response to determining to remove the application bundle.

10. A computer program product for managing a file system having a cluster of compute nodes to process a stream of tuples using an application bundle, the computer program product comprising a computer readable storage medium having program instructions embodied therewith, wherein the computer readable storage medium is not a transitory signal per se, the program instructions executable by a processor to cause the processor to perform a method comprising:
establishing, on the cluster of compute nodes, a cluster bundle directory, wherein the cluster bundle directory is a first level of a multilevel directory structure, and wherein the cluster bundle directory is a global directory that tracks which host has the application bundle installed;
establishing, on a first compute node of the cluster of compute nodes, a host bundle library, wherein the host bundle library is a second level of the multilevel directory structure, and wherein the host bundle library is a local library that tracks which host shares the application bundle;
receiving the stream of tuples to be processed by a plurality of processing elements operating on the cluster of compute nodes including the first compute node;
detecting, using the cluster bundle directory, that the application bundle is not installed on the first compute node;
determining, using both the cluster bundle directory and the host bundle library, to initiate a sourcing operation with respect to the application bundle; and
processing, in response to initiating the sourcing operation, the stream of tuples using the application bundle.

11. The computer program product of claim 10, wherein the program instructions are stored in a computer readable storage medium in a data processing system, and the program instructions were downloaded over a network from a remote data processing system.

12. The computer program product of claim 10, wherein the program instructions are stored in a computer readable storage medium in a server data processing system, and the program instructions are downloaded over a network to a remote data processing system for use in a computer readable storage medium with the remote data processing system.

* * * * *